United States Patent
Lee et al.

(10) Patent No.: US 12,209,350 B2
(45) Date of Patent: Jan. 28, 2025

(54) WASHING MACHINE AND CONTROL METHOD THEREOF

(71) Applicant: SAMSUNG ELECTRONICS CO., LTD., Suwon-si (KR)

(72) Inventors: Seunghun Lee, Suwon-si (KR); Junhyun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 261 days.

(21) Appl. No.: 17/741,572

(22) Filed: May 11, 2022

(65) Prior Publication Data

US 2022/0349109 A1    Nov. 3, 2022

Related U.S. Application Data

(63) Continuation of application No. PCT/KR2022/095059, filed on Mar. 22, 2022.

(30) Foreign Application Priority Data

Apr. 28, 2021  (KR) .................. 10-2021-0055247

(51) Int. Cl.
*D06F 39/08*  (2006.01)
*D06F 33/32*  (2020.01)
(Continued)

(52) U.S. Cl.
CPC ............ *D06F 39/085* (2013.01); *D06F 33/32* (2020.02); *D06F 34/18* (2020.02); *D06F 39/04* (2013.01);
(Continued)

(58) Field of Classification Search
CPC ........ D06F 39/04; D06F 39/08; D06F 39/083; D06F 39/085; D06F 39/087;
(Continued)

(56) References Cited

U.S. PATENT DOCUMENTS 11,377,774 B2    7/2022  Lv et al.
2003/0154558 A1*  8/2003  Pyo .................. D06F 13/08
                                                                8/158

(Continued)

FOREIGN PATENT DOCUMENTS

EP    1 961 854 A1    8/2008
EP    2 065 508 A1    6/2009
(Continued)

OTHER PUBLICATIONS

Machine Translation of Horibe et al., JP 2013-052127 A, Mar. 2013. (Year: 2013).*

(Continued)

*Primary Examiner* — David G Cormier
(74) *Attorney, Agent, or Firm* — STAAS & HALSEY LLP

(57) ABSTRACT

A washing machine according to an aspect of the disclosure includes: a tub; a drum rotatably provided inside the tub; a heater configured to heat water; a circulating pump configured to circulate a part of the water stored in the tub; a water level sensor configured to sense a water level of water in the tub; and a controller configured to control the circulating pump to circulate the part of the water stored in the tub, and control revolutions per minute (rpm) of a motor of the circulating pump based on a water level of the water while the water stored in the tub circulates and the heater is driven.

20 Claims, 13 Drawing Sheets

(51) Int. Cl.
  *D06F 34/18* (2020.01)
  *D06F 39/04* (2006.01)
  *D06F 103/04* (2020.01)
  *D06F 103/18* (2020.01)
  *D06F 105/06* (2020.01)

(52) U.S. Cl.
  CPC ........ *D06F 39/087* (2013.01); *D06F 2103/04* (2020.02); *D06F 2103/18* (2020.02); *D06F 2105/06* (2020.02)

(58) Field of Classification Search
  CPC ............. D06F 2103/04; D06F 2103/14; D06F 2103/16; D06F 2103/18; D06F 2105/06
  See application file for complete search history.

(56) References Cited

U.S. PATENT DOCUMENTS

| | | | | |
|---|---|---|---|---|
| 2006/0191078 A1* | 8/2006 | Kim | ........................ | D06F 33/32 8/158 |
| 2008/0256722 A1 | 10/2008 | Oberkirsch et al. | | |
| 2016/0115635 A1* | 4/2016 | Lee | ........................ | D06F 39/083 68/132 |
| 2019/0069752 A1* | 3/2019 | Persson | ................. | D06F 39/085 |
| 2021/0047768 A1* | 2/2021 | Contarini | .............. | F04D 29/486 |
| 2021/0317834 A1* | 10/2021 | Lee | ..................... | F04D 29/2238 |

FOREIGN PATENT DOCUMENTS

| | | |
|---|---|---|
| JP | 2013-52127 | 3/2013 |
| JP | 2017-80088 | 5/2017 |
| KR | 10-2007-0003357 | 1/2007 |
| KR | 10-0721386 | 5/2007 |
| KR | 10-1146273 | 5/2012 |
| KR | 10-1154989 | 6/2012 |
| KR | 10-1492498 | 2/2015 |
| KR | 10-2016-0111686 | 9/2016 |
| KR | 10-2016-0146057 | 12/2016 |
| KR | 10-2020-0005381 | 1/2020 |
| KR | 10-2021-0128779 | 10/2021 |
| KR | 10-2457411 | 10/2022 |
| KR | 10-2459587 | 10/2022 |

OTHER PUBLICATIONS

Machine Translation of Masuda et al., JP 2017-080088 A, May 2017. (Year: 2017).*
International Search Report dated Jul. 14, 2022 for International Application No. PCT/KR2022/095059.
Extended European Search Report dated May 17, 2024 for European Application No. 22796237.0.

* cited by examiner

WASHING MACHINE AND CONTROL METHOD THEREOF

CROSS-REFERENCE TO RELATED APPLICATION

This application is a continuation application, under 35 U.S.C. § 111(a), of International Patent Application No. PCT/KR2022/095059, filed on Mar. 22, 2022, and claims priority under 35 U.S.C. § 119 to Korean Patent Application No. 10-2021-0055247, filed on Apr. 28, 2021 in the Korean Intellectual Property Office, the disclosures of which are incorporated by reference herein in their entirety.

FIELD

The disclosure relates to a washing machine capable of washing laundry such as clothes and a control method thereof.

DESCRIPTION OF RELATED ART

A washing machine is a machine for washing clothes by using power, and the washing machine generally includes a tub storing water, and a drum for removing contaminants from laundry by generating mechanical energy inside the tub.

The washing machine includes a circulating pump for circulating water stored in the tub and spraying the water to laundry, a drain pump for draining water stored in the tub to outside, and a motor for driving the circulating pump and the drain pump.

The circulating pump and drain pump of the washing machine adjust a flow rate and revolutions per minute (rpm) of the motor by applying a Brushless Direct Current (BLDC) motor.

Meanwhile, in a washing course or a rinsing course, the washing machine sprays water supplied to the tub to laundry by using the circulating pump, and adjusts a circulating quantity of water by adjusting the rpm of the motor. In this case, an amount of wetting or washing performance is improved, however, a heater for heating water supplied to the tub is exposed out of a water level, which may result in the occurrence of danger such as overheating.

SUMMARY

The disclosure relates to a washing machine including a tub configured to receive water; a drum rotatably disposed inside the tub; a heater configured to heat the water in the tub; a circulating pump configured to circulate a portion of the water received in the tub; a water level sensor configured to sense a water level of the water in the tub; and a controller configured to control the circulating pump to circulate the portion of the water received in the tub, and control revolutions per minute (rpm) of a motor of the circulating pump based on the sensed water level of the water, while the water in the tub circulates and the heater is driven, so that a predefined water level is maintained while the heater driven.

The controller may control the circulating pump to reduce the rpm of the motor in a case in which the water level of the water in the tub is lower than or equal to the predefined water level.

The controller may control the circulating pump to reduce the rpm of the motor to a predefined rpm or by a predefined amount.

The controller may control the circulating pump to be repeatedly turned-on and turned-off according to a predefined time period and increase a turned-on time during the predefined time period.

The controller may control the circulating pump to change a turned-off operation to a turned-on operation during the predefined time period.

The controller may increase a driving time of the circulating pump in response to a reduction of the rpm of the motor.

The controller may obtain a water level frequency of the tub through the water level sensor, obtain the water level of the water based on a change of the water level frequency, and reduce the rpm of the circulating pump in a case in which a change of the water level frequency is sensed.

The controller may control the circulating pump to maintain the rpm of the motor at an initial rpm in a case in which no change of the water level frequency is sensed.

The controller may control the circulating pump to maintain the rpm of the motor at initial rpm in a case in which the heater is not driven.

The controller may control the circulating pump to be driven according to constant rpm of the motor, control the circulating pump to be repeatedly turned-on and turned-off, and control the circulating pump to reduce the rpm of the motor for a turned-on time period of the heater.

The controller may reduce a quantity of water that is sprayed to an interior of the tub by reducing the rpm of the motor.

The controller may sense a weight of laundry in the tub, and supply the water to the tub according to a quantity of supply water corresponding to the weight of the laundry.

The controller may obtain, in a case in which the sensed weight of the laundry is smaller than a predefined weight, a water level frequency of the tub through the water level sensor, obtain the water level of the water based on a change of the water level frequency, and control the circulating pump to reduce the rpm of the motor in a case in which a change of the water level frequency is sensed.

The controller may control, in a case in which the sensed weight of the laundry is greater than or equal to the predefined weight, the circulating pump to maintain the rpm of the motor at initial rpm of the motor.

The controller may control the circulating pump to reduce the rpm of the motor by applying a weight value to the rpm of the motor, the weight value being proportional to the weight of the laundry.

In accordance with an aspect of the disclosure, a method for controlling a washing machine, the washing machine including a tub configured to receive water, a heater configured to heat the water, a circulating pump configured to pump the water received in the tub so that a portion of the water in the tub is sprayed to an interior of the tub, and a water level sensor configured to sense a water level of the water in the tub, the method includes: controlling the circulating pump to circulate the portion of the water in the tub; and controlling revolutions per minute (rpm) of a motor of the circulating pump based on a water level of the water, while the water stored in the tub circulates and the heater is driven, so that a predefined water level is maintained while the heater is driven.

The controlling of the circulating pump may include controlling the circulating pump to reduce the rpm of the motor in a case in which the sensed water level of the water in the tub is lower than or equal to the predefined water level.

The controlling of the circulating pump may include controlling the circulating pump to reduce the rpm of the motor to predefined rpm or by a predefined amount.

The method may further include controlling the circulating pump to be repeatedly turned-on and turned-off according to a predefined time period and increase a turned-on time during the predefined time period.

The controlling of the circulating pump may include controlling the circulating pump to change a turned-off operation to a turned-on operation during the predefined time period.

The controlling of the circulating pump may include obtaining a water level frequency of the tub through the water level sensor, obtaining the water level of the water based on a change of the water level frequency, and reducing the rpm of the circulating pump in a case in which a change of the water level frequency is sensed.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
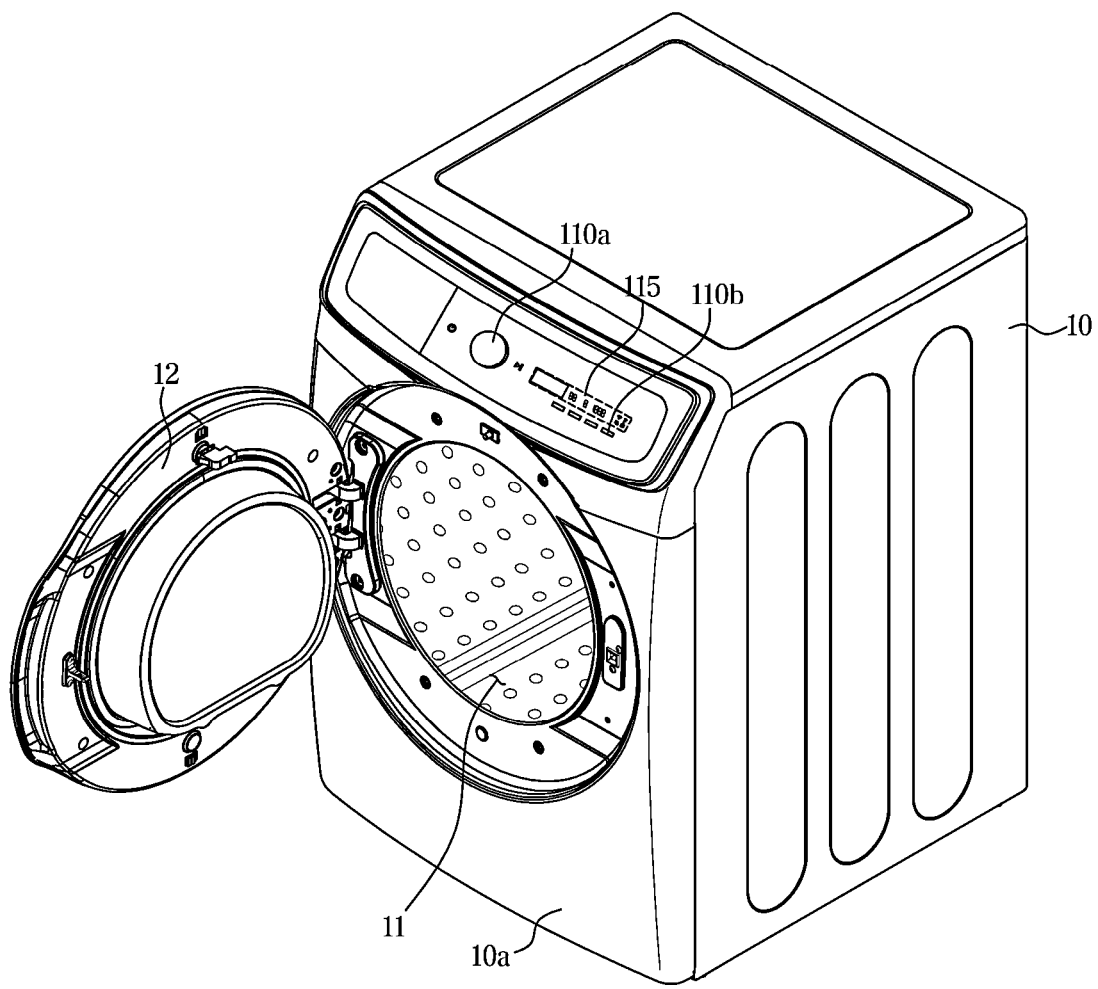
FIG. 1 shows an outer appearance of a washing machine according to an embodiment of the disclosure.

Like reference numerals will refer to like components throughout this specification. This specification does not describe all components of the embodiments, and general information in the technical field to which the disclosure belongs or overlapping information between the embodiments will not be described. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

It will be understood that when a certain part is referred to as being "connected" to another part, it can be directly or indirectly connected to the other part. When a certain part is indirectly connected to another part, it may be connected to the other part through a wireless communication network.

Also, it will be understood that when a certain part "includes" a certain component, the part does not exclude another component but can further include another component, unless the context clearly dictates otherwise.

In the entire specification, it will also be understood that when a certain element is referred to as being "on" or "over" another element, it can be directly on the other element or intervening elements may also be present.

It will be understood that, although the terms "first", "second", etc., may be used herein to describe various components, these components should not be limited by these terms. The above terms are used only to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Throughout the disclosure, the expression "at least one of a, b or c" indicates only a, only b, only c, both a and b, both a and c, both b and c, all of a, b, and c, or variations thereof.

Therefore, it is an aspect of the disclosure to provide a washing machine capable of preventing overheating of a heater by maintaining a safe water level of a tub in which the heater is installed, and a method for controlling the washing machine.

Hereinafter, embodiments of the disclosure will be described in detail with reference to the accompanying drawings.

Figure 2:
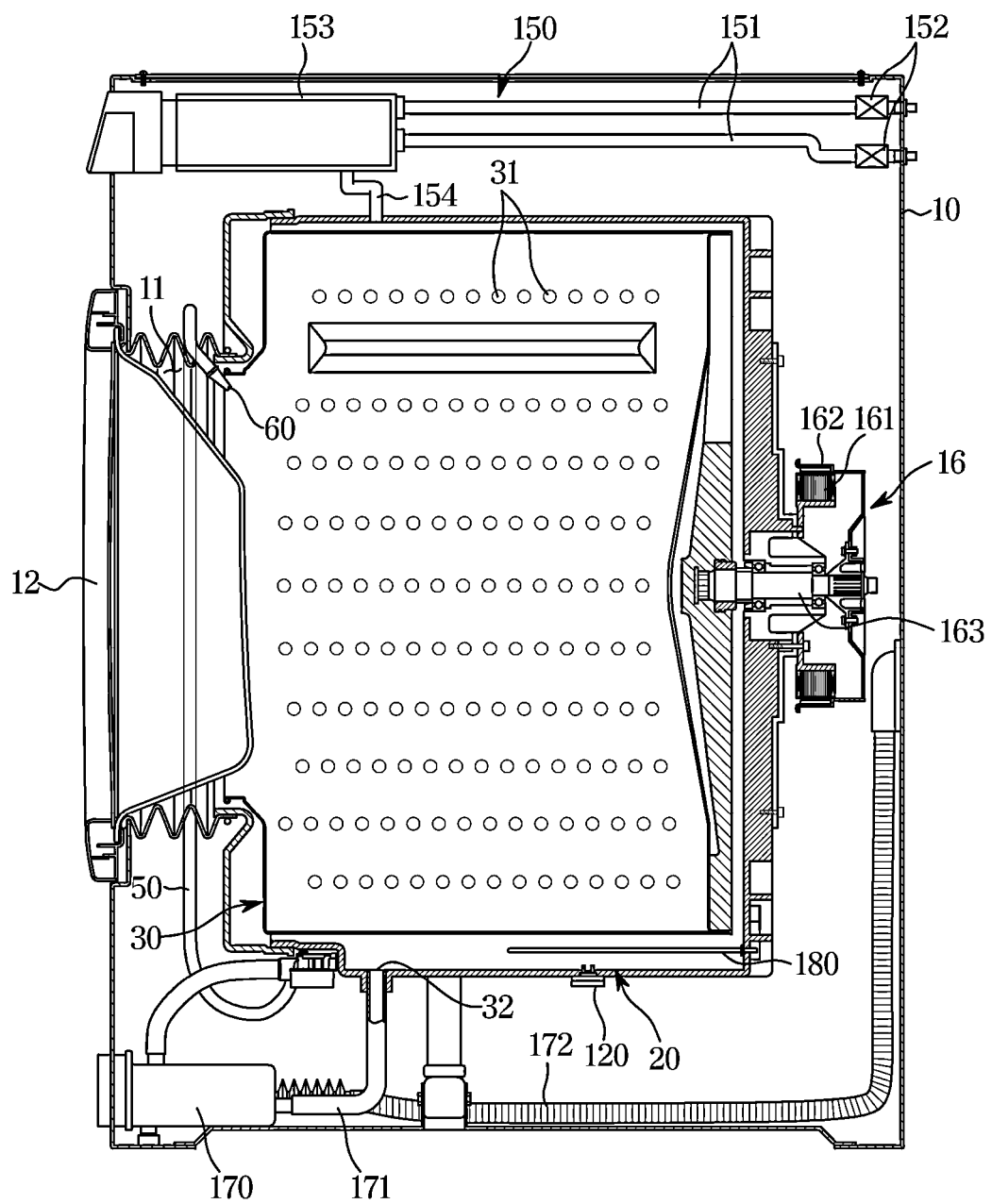
FIG. 2 is a side cross-sectional view of a washing machine according to an embodiment of the disclosure.
Figure 3:
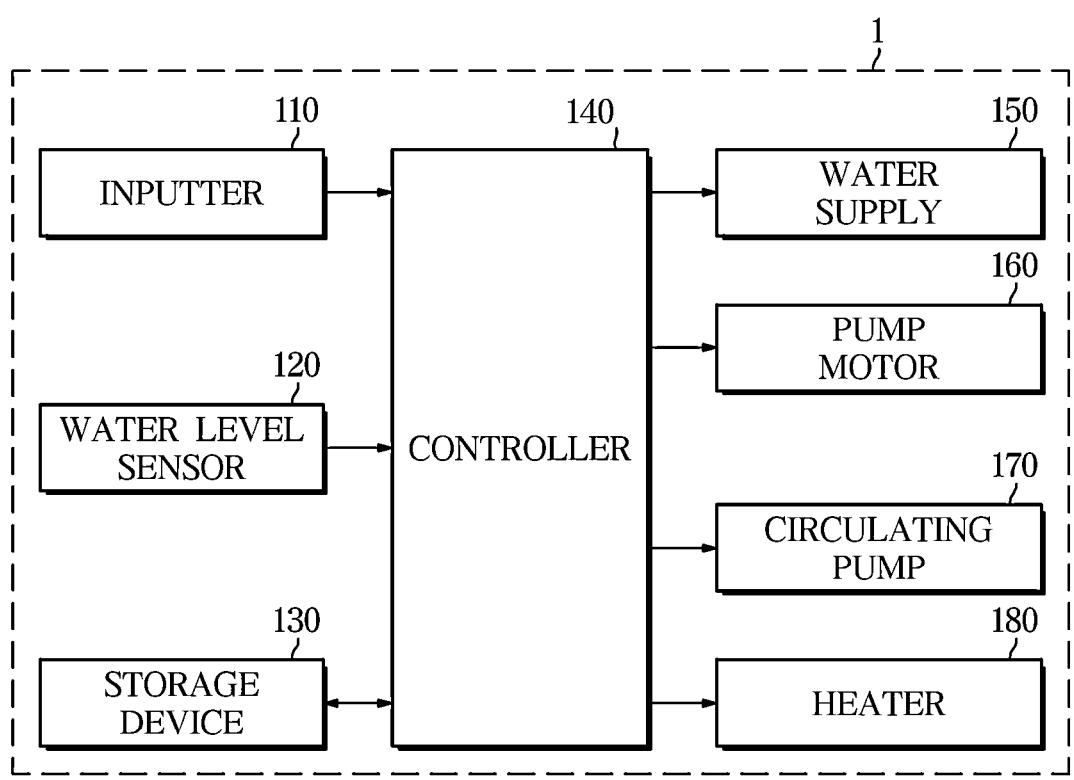
FIG. 3 is a control block diagram of a washing machine according to an embodiment of the disclosure.

FIG. 1 shows an outer appearance of a washing machine according to an embodiment of the disclosure, FIG. 2 is a side cross-sectional view of a washing machine according to an embodiment of the disclosure, and FIG. 3 is a control block diagram of a washing machine according to an embodiment of the disclosure.

Referring to FIGS. 1, 2, and 3, a washing machine 1 according to an embodiment of the disclosure may include a main body 10 forming an outer appearance, a tub 20 installed inside the main body 10 and storing water in a washing course or a rinsing course, and a drum 30 rotatably installed inside the tub 20, wherein a plurality of through holes 31 are formed in the drum 30.

In a front cover 10a of the main body 10, an opening 11 may be formed to enable a user to put laundry to inside of the drum 30, and a door 12 for opening and closing the opening 11 may be installed.

In an upper portion of the front cover 10a, an inputter 110 for receiving a control command from a user, and a display 115 for displaying various information related to operations of the washing machine 1 or guiding the user to make an input may be positioned.

The inputter 110 may be provided in a form of a jog shuttle or a dial to enable the user to input a control command by gripping the inputter 110 and then turning the inputter 110 or pressing the inputter 110, or the inputter 110 may be provided in a form of a touch pad or a button to enable the user to input a control command by touching or pressing the inputter 110b.

For example, the inputter 110 may include an inputter 110a provided in a form of a jog shuttle and an inputter 110b provided in a form of a touch pad.

The inputter 110 according to an embodiment of the disclosure may receive an input for a desired course from a user. The user may input the desired course by gripping the inputter 110a and then turning the inputter 110a. In this case, the display 115 may display a course selected whenever the inputter 110 turns, and the user may press a start/pause button 110b upon a selection of the desired course to control the washing machine 1 to perform the desired course.

Also, the inputter 110 may receive an input for a detailed option from the user through a washing temperature button (not shown), a number-of-rinses button (not shown), a dehydrating strength button (not shown), or an additional function button (not shown).

The display 115 may be implemented by various display panels, such as a Liquid Crystal Display (LCD), Light Emitting Diodes (LED), an Organic Light Emitting Diodes (OLED), Quantum dot Light Emitting Diodes (QLED), etc., or the display 115 may be implemented as a touch screen including a touch pad on the front side to function as the inputter 110 for receiving inputs from the user.

The display 115 may display a corresponding course according to a rotation of the inputter 110, and display washing temperature (not shown) selected through the washing temperature button (not shown) or corresponding to a default setting value.

Also, the display 115 may display a number of rinses selected through the number-of-rinses button or corresponding to a default setting value, a dehydrating strength selected through the dehydrating strength button or corresponding to a default setting value, and an additional function selected through the additional function button.

According to an embodiment of the disclosure, the display 115 may display the corresponding content in the order of a course, washing temperature, the number of rinses, dehydrating strength, and an additional function from the left. That is, a course may be displayed to the right of the start/pause button, washing temperature may be displayed to the right of the course, the number of rinses may be displayed to the right of the washing temperature, dehydrating strength may be displayed to the right of the number of rinses, and an additional function may be displayed to the right of the dehydrating strength.

In this case, the washing temperature button, the number-of-rinses button, the dehydrating strength button, and the additional function button of the inputter 110 may be respectively positioned below the washing temperature, the number of rinses, the dehydrating strength, and the additional function, which are displayed on the display 115.

In a lower inner portion of the tub 20, a heater 180 for heating water stored in the tub 20, and a water level sensor 120 (see FIG. 3) for sensing a frequency changing according to a water level to sense a quantity (water level) of water stored in the drum 30 may be installed.

Upon supply of water to the tub 20, the heater 180 may adjust a heating time and/or heating temperature according to a quantity of the supplied water such that temperature of the water reaches target temperature. The heater 180 may be provided in the lower inner portion of the tub 20 and heat water by thermal conduction through the tub 20. In a case in which a sufficient quantity of water is stored in the tub 20, the heater 180 may transfer generated heat to the water. In this case, a danger of overheating may be low. However, in a case in which no water is stored in the tub 20 or an insufficient quantity of water is stored in the tub 20, heat generated by the heater 180 may be not discharged to the outside, resulting in the occurrence of danger of overheating. According to the disclosure, by maintaining an appropriate water level of water stored in the tub 20, the heater 180 may be prevented from being overheated. A detailed control method for preventing the heater 180 from being overheated will be described in detail, below.

The water level sensor 120 may obtain a water level of water stored in the tub 20 by obtaining a water level frequency corresponding to internal pressure of the tub 20. A high water level of the tub 20 may raise internal pressure of the tub 20 and lower a water level frequency. In contrast, a low water level of the tub 20 may lower internal pressure of the tub 20 and raise a water level frequency. Based on the characteristics, a controller 140 may obtain water level information about an inside water level of the tub 20 by receiving a water level frequency from the water level sensor 120.

In an inner upper portion of the main body 10, a water supply 150 for supplying water to the tub 20 may be installed.

The water supply 150 may include a first water supply pipe 151 connected to an external water supply source (not shown), a water supply valve 152 for opening and closing the first water supply pipe 151, a detergent supply 153 for mixing a detergent or a softener with water supplied through the first water supply pipe 151, and a second water supply pipe 154 connecting the detergent supply 153 with the tub 20 to guide washing water being a mixture of water and a detergent or rinsing water being a mixture of water and a softener to the tub 20.

The detergent supply 153 may be partitioned into a detergent storage space and a softener storage space, and the first water supply pipe 151 may be configured with a water supply pipe connected to the detergent storage space and another water supply pipe connected to the softener storage space.

On a rear outer surface of the tub 20, a motor 16 for rotating the drum 30 may be provided. The motor 16 may include a stator 161 installed on the tub 20, a rotor 162 rotating while interworking with the stator 161, and a rotating shaft 163 of which one end is installed on the rotor 162 and of which the other end penetrates a rear plate of the tub 20 and is installed on the drum 20 to rotate the drum 20 while rotating together with the rotor 162.

In an inner lower portion of the main body 10, a circulating pump 170 for sucking in water stored in the tub 20 may be installed. The circulating pump 170 may pump water to spray a part of water stored in the tub 20 to the inside of the tub 20.

The circulating pump 170 may include a pump motor 160 of which the rpm is controllable to adjust a circulating quantity of water. The pump motor 160 may be accommodated in a housing (not shown) of the circulating pump 170, and may be a Brushless Direct Current (BLDC) motor that is driven by an inverter (not shown). The controller 140 may control an input voltage that is applied to the pump motor 160 to adjust rpm of the pump motor 160 according to the input voltage that is applied to the pump motor 160, thereby adjusting a quantity of water of the circulating pump 170.

The circulating pump 170 may be connected to a plurality of pipes. The plurality of pipes may include a first drain pipe 171 connected to a drain 32 of the tub 20, and a second drain pipe 172 for pumping water sucked from the tub 20 and discharging the water to the outside of the main body 10. In this specification, for convenience of description, the circulating pump 170 is not distinguished from a drain pump (not shown), however, the circulating pump 170 and the drain pump may be implemented as a single pump or two independent pumps.

The circulating pump 170 may discharge a part of water supplied to the tub 20 through the first drain pipe 171, and circulate a part of water to spray the water to laundry accommodated inside the tub 20 through a spraying hole 60.

The circulating pump 170 may adjust a circulating quantity of water according to rpm of the pump motor 160. According to an embodiment of the disclosure, the controller 140 may adjust the rpm of the pump motor 160 by adjusting a magnitude of an input voltage that is applied to the pump motor 160. A quantity of water circulating by the circulating pump 170 may be determined by a control of an input voltage by the controller 140 with respect to the pump motor 160, and the circulating quantity of water may be equal to a quantity of water that is to be discharged from the tub 20.

The washing machine 1 may include a storage device 130 storing various kinds of information required for control, and the controller 140 for controlling the washing machine 1.

The storage device 130 according to an embodiment of the disclosure may store information about operations for individual courses, and may be a storage medium known in the art.

The storage device 130 according to an embodiment of the disclosure may store a table about quantities of supply water according to weights of laundry. For example, the storage device 130 may classify weights of laundry into several sections, and store a quantity of supply water corresponding to each section. After a weight of laundry is sensed, the controller 140 may supply water to the tub 20 according to a quantity of supply water corresponding to the weight of laundry, stored in the storage device 130.

The controller 140 may control the circulating pump 170 to spray a part of water supplied to the tub 20 to the laundry. More specifically, the controller 140 may adjust a circulating quantity of water that is sprayed through the circulating pump 170 by adjusting rpm of the pump motor 160 that provides a driving force to the circulating pump 170. For example, the controller 140 may control the pump motor 160 to raise rpm of the pump motor 160, thereby increasing a circulating quantity of water. Also, the controller 140 may control the pump motor 160 to lower rpm of the pump motor 160, thereby decreasing a circulating quantity of water. The related operations and embodiments of the controller 140 will be described in more detail with reference to FIGS. 4 and 5, below.

Figure 4:
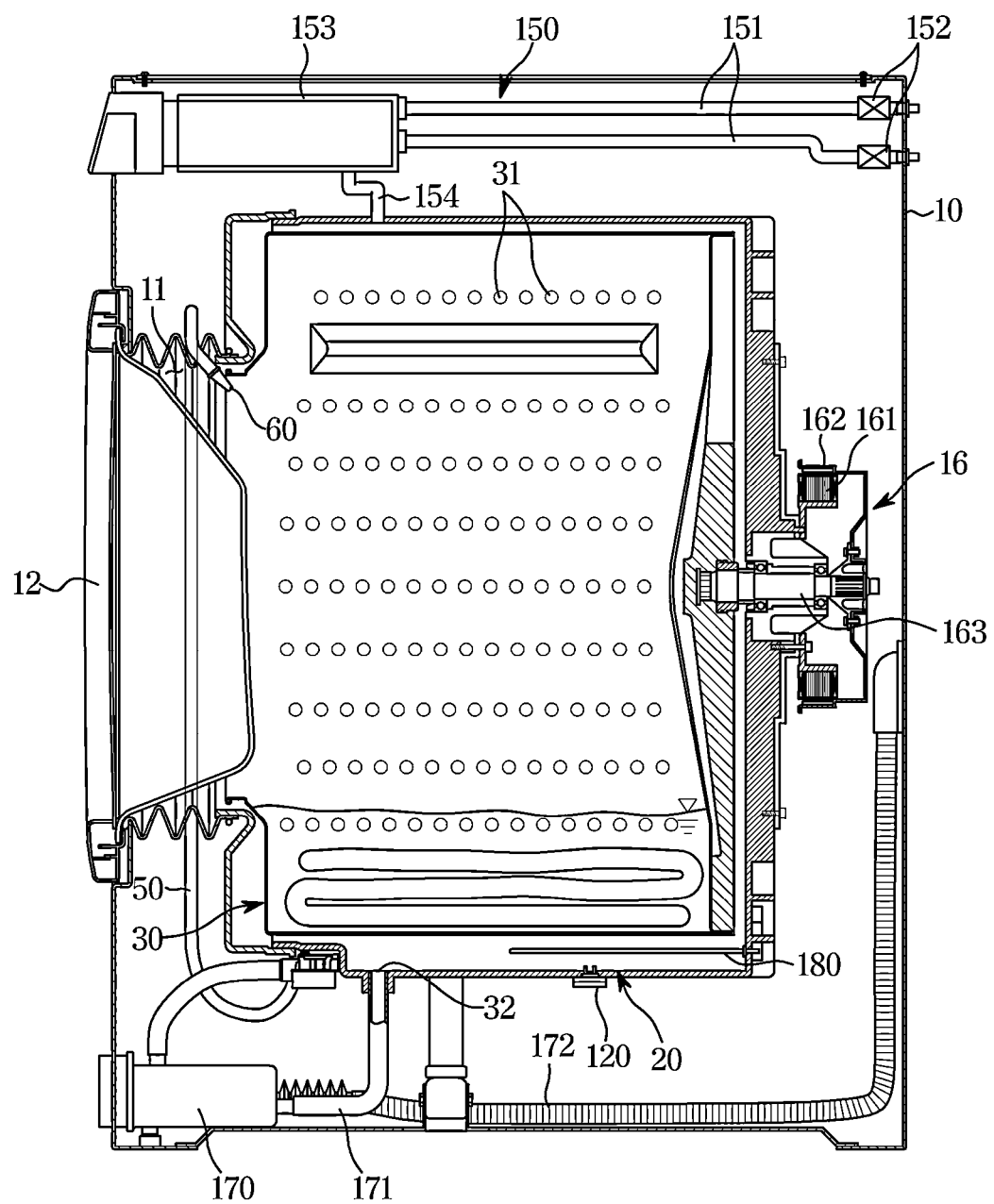
FIG. 4 shows a case in which laundry is put into a washing machine according to an embodiment of the disclosure.
Figure 5:
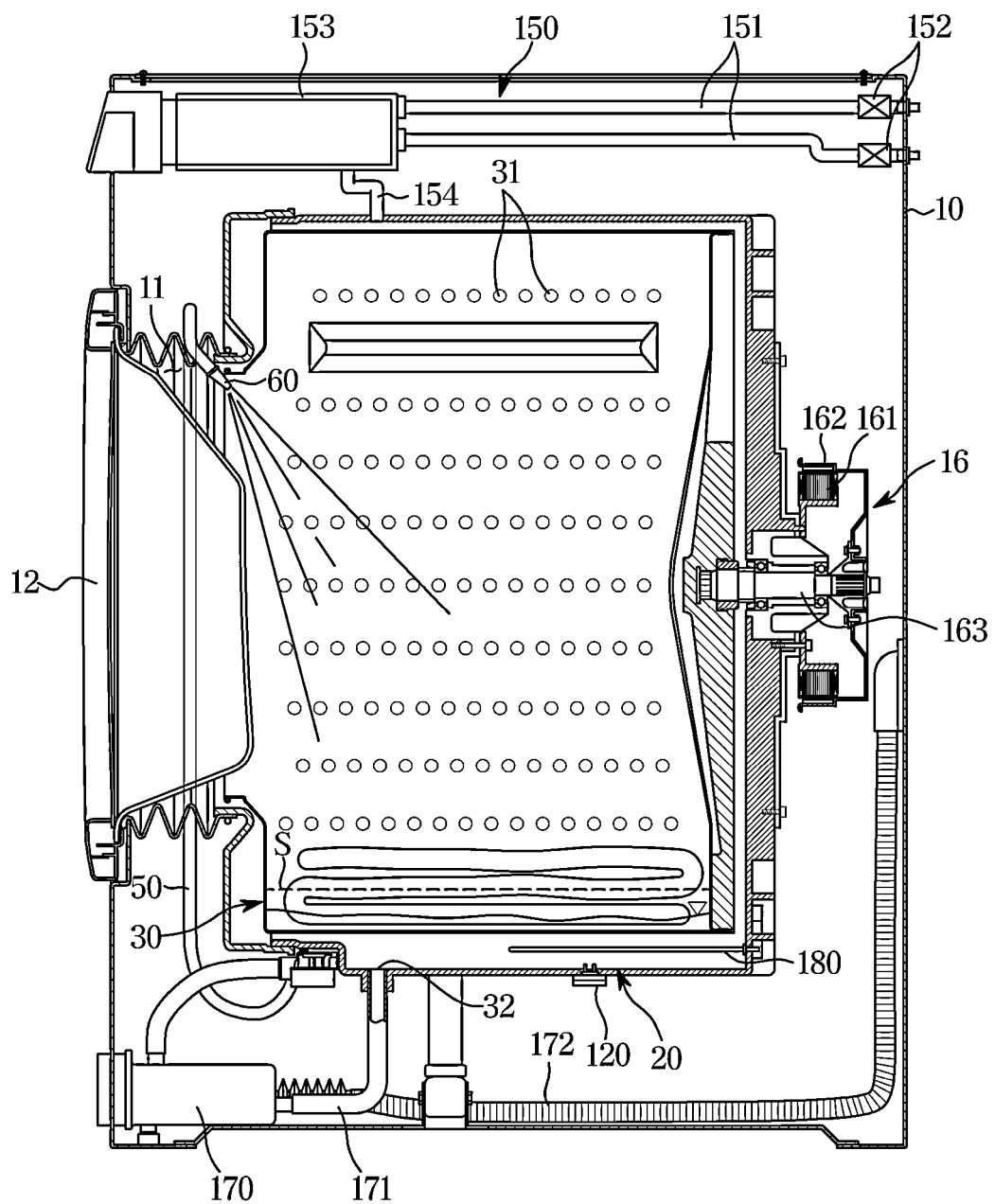
FIG. 5 shows a case in which a washing machine according to an embodiment of the disclosures sprays water to laundry by operating a circulating pump.

FIG. 4 shows a case in which laundry is put into a washing machine according to an embodiment of the disclosure, and FIG. 5 shows a case in which a washing machine according to an embodiment of the disclosures sprays water to laundry by operating a circulating pump.

Referring to FIG. 4, the washing machine 1 may accommodate laundry in the tub 20, and supply water according to a quantity of supply water corresponding to a weight of the accommodated laundry. As described above, a quantity of supply water may be determined based on a table about quantities of supply water according to weights of laundry, stored in the storage device 130, and a larger quantity of water may be supplied to correspond to a greater weight of laundry.

The washing machine 1 may include the heater 180 provided in the lower inner portion of the tub 20 and configured to heat water supplied to the tub 20.

As shown in FIG. 5, the washing machine 1 may drive the circulating pump 170 to spray a part of water supplied to the tub 20 to the laundry.

The washing machine 1 may operate the circulating pump 170 to transfer a part of water supplied to the tub 20 to a circulating flow path 50 through the first drain pipe 171, and spray the transferred water to the laundry through the spraying hole 60. At this time, a circulating quantity of water may be determined by rpm of the pump motor 160 that drives the circulating pump 170.

Meanwhile, because the circulating quantity of water is determined by the rpm of the pump motor 160 and provided through the circulating flow path 50 having a certain volume, a minimum requirement for a circulating quantity of water may be decided. Also, because the circulating quantity of water is a part of water supplied to the tub 20, the circulating quantity of water may be less than a total quantity of water supplied to the tub 20.

A quantity of water stored in the tub 20 may be reduced by a minimum requirement for a circulating quantity of water, and a water level of the tub 20 may be lowered. In a case in which all water supplied to the tub 20 is used as a circulating quantity of water, or a water level drops lower than a safe water level S at which the heater 180 is prevented from being overheated, as shown in FIG. 5, there may be a danger of overheating. Accordingly, the washing machine 1 may need to perform an operation for maintaining the safe water level S of the tub 20. The safe water level S may be a minimum quantity of water capable of performing cooling by using water in the tub 20, and may be criterion for preventing the heater 180 from being overheated. The safe water level S may be determined by a specification, target temperature, etc. of the washing machine 1, and may be a water level defined in advance according to a setting.

According to an embodiment of the disclosure, the controller 140 may reduce a quantity of water to be sprayed to the inside of the tub 20 by reducing rpm of the pump motor 160. Accordingly, by reducing a circulating quantity of water by the circulating pump 170 and increasing a quantity of water stored in the tub 20, the controller 140 may maintain a water level that is higher than or equal to the safe water level S. In a case in which there is a danger of overheating of the heater 180 due to insufficient water in the tub 20, the controller 140 may control the pump motor 160, and a determination criterion and a control process thereof will be described in detail with reference to FIGS. 6 to 8, below.

Figure 6:
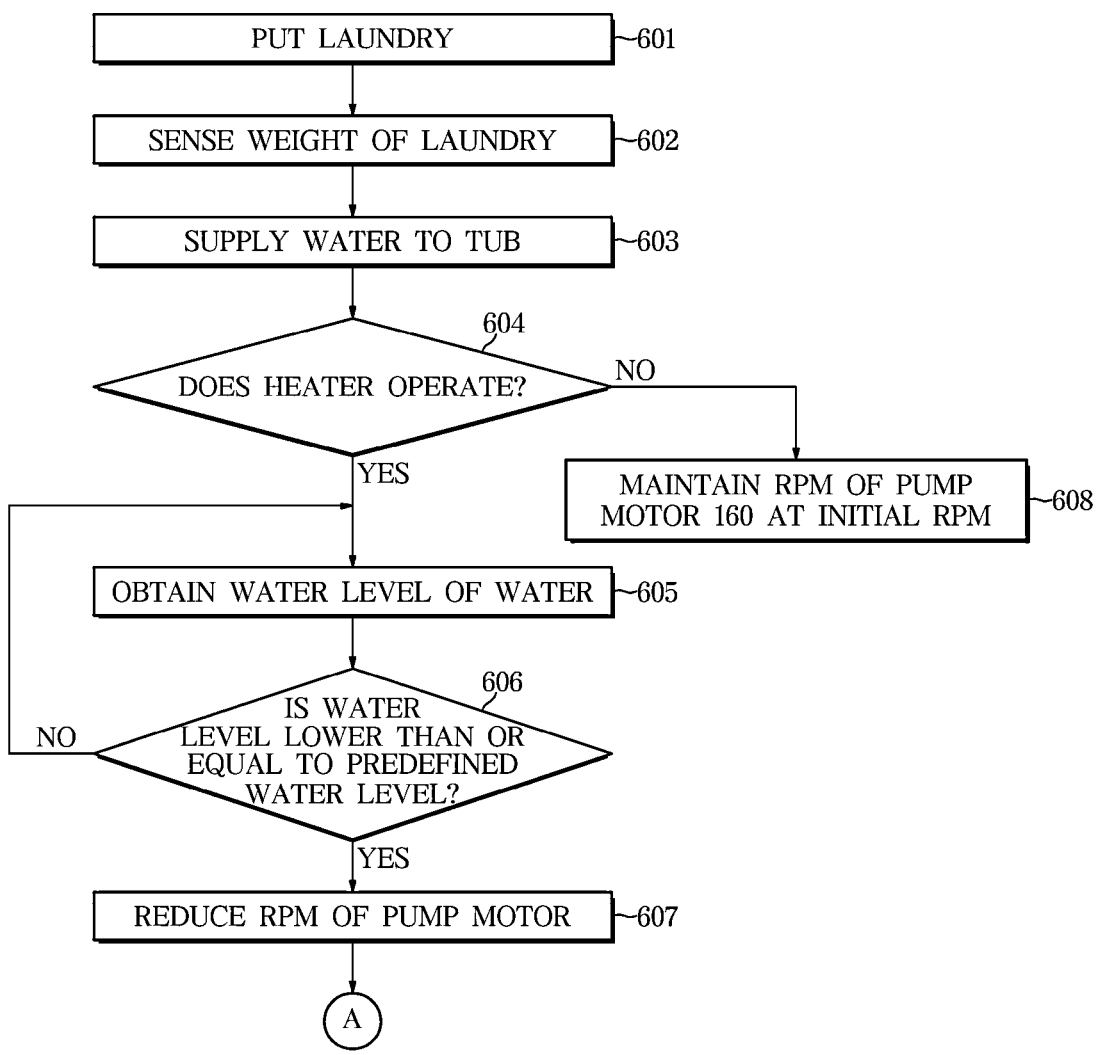
FIG. 6 is a flowchart illustrating a method for controlling a washing machine, according to an embodiment of the disclosure.
Figure 7:
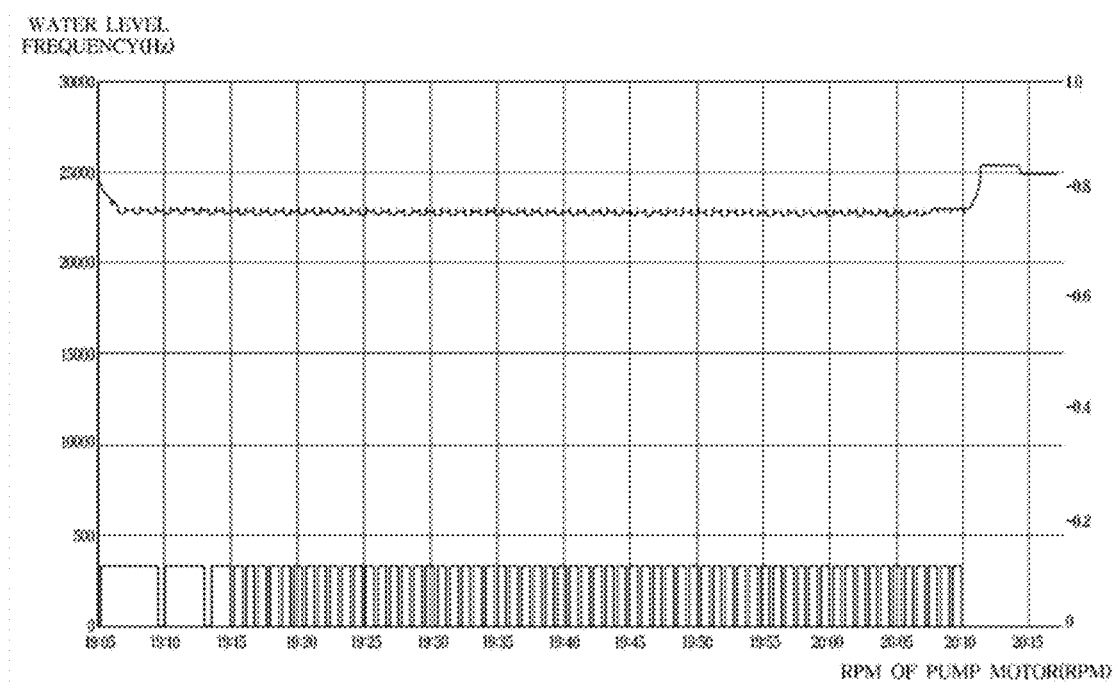
FIG. 7 shows an operation of a circulating pump in a normal washing course.
Figure 8:
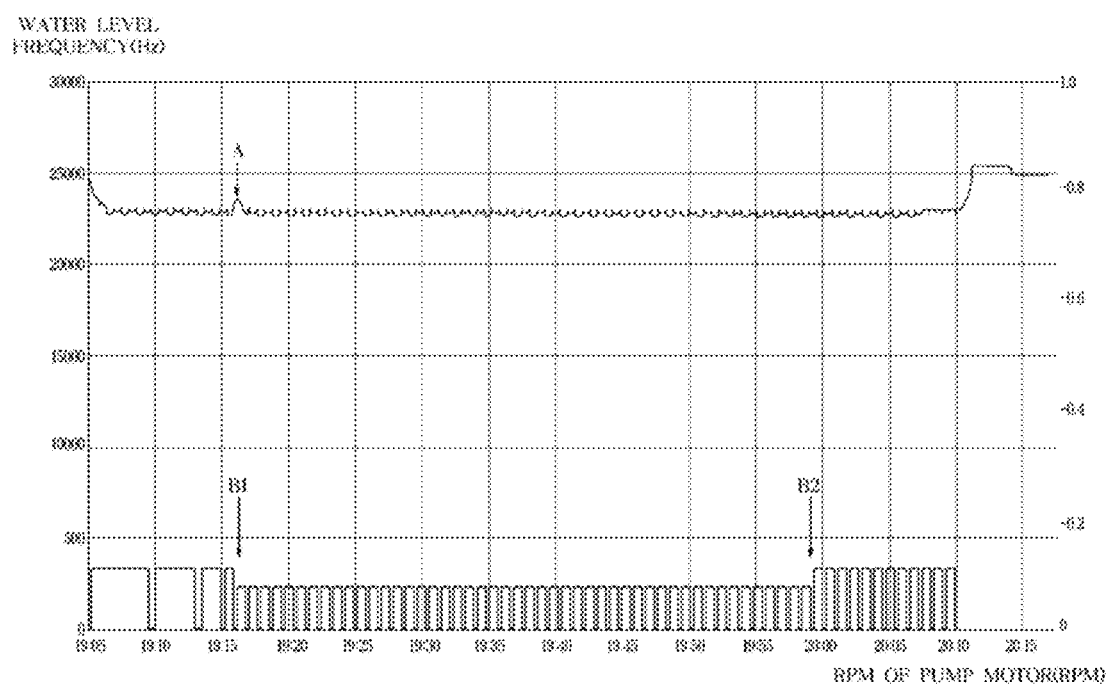
FIG. 8 shows an operation of a circulating pump in a washing course of a washing machine according to an embodiment of the disclosure.

FIG. 6 is a flowchart illustrating a method for controlling a washing machine, according to an embodiment of the disclosure, FIG. 7 shows an operation of a circulating pump in a normal washing course, and FIG. 8 shows an operation of a circulating pump in a washing course of a washing machine according to an embodiment of the disclosure. Hereinafter, the control method of FIG. 6 will be described by together referring to FIGS. 7 and 8.

Laundry may be put to the washing machine 1, in operation 601. Then, the controller 140 may sense a weight of the laundry, in operation 602. At this time, the controller 140 may sense the weight of the laundry by using a weight sensor (not shown) provided in the washing machine 1, or based on a change amount of a load by a rotation of the motor 16. However, a method for sensing a weight of laundry is not limited to these, and various known weight sensing techniques may be applied.

After the laundry is put and the weight of the laundry is sensed, the washing machine 1 may supply water to the tub 20, in operation 603. The controller 140 may control the water supply 150 to supply water from the outside through the first water supply pipe 151. The controller 140 may supply a quantity of water corresponding to the sensed weight of the laundry to the tub 20 based on the weight of the laundry sensed in operation 602.

Meanwhile, because the disclosure relates to preventing the heater 180 from being overheated by a circulating quantity of water, a case in which the heater 180 does not operate will require no control process.

Accordingly, the controller 140 may determine whether the heater 180 operates, in operation 604, and, in a case in which the heater 180 does not operate, the controller 140 may maintain rpm of the pump motor 160 at initial rpm, in operation 608. In other words, because the washing machine 1 does not need to maintain the safe water level S, the washing machine 1 may spray water stored in the tub 20 to the laundry without limitation.

The controller 140 may determine whether the heater 180 operates, in operation 604, and, in a case in which the heater 180 operates, the controller 140 may obtain a current water level of water stored in the tub 20, in operation 605. The water level may be obtained through the water level sensor 120, and the water level sensor 120 may obtain the water level of the water stored in the tub 20 by obtaining a water level frequency corresponding to internal pressure of the tub 20, and transfer the water level to the controller 140.

The controller 140 may obtain the current water level, and then determine whether the water level is lower than or equal to a predefined water level, in operation 606. The predefined water level may correspond to the safe water level S. The safe water level S may be a minimum quantity of water capable of performing cooling by using water in the tub 20, and may be criterion for preventing the heater 180 from being overheated. According to an embodiment of the disclosure, the predefined water level may be the safe water level S. However, the predefined water level may be set to be higher than the safe water level S to tighten criterion against overheating of the heater 180.

In a case in which the water level is lower than or equal to the predefined water level, the controller 140 may reduce rpm of the pump motor 160, in operation 607. According to the reduction of the rpm of the pump motor 160, a quantity of water circulating by the circulating pump 170 may be reduced, and water corresponding to the reduced circulating quantity of water may be supplied to the tub 20 to maintain the safe water level S of the tub 20.

The controller 140 according to an embodiment of the disclosure may control the pump motor 160 such that the rpm of the pump motor 160 is reduced to predefined rpm or by a predefined portion. For example, to secure the safe water level S, the controller 140 may control the pump motor 160 such that the rpm of the pump motor 160 is reduced to 20 rpm which is predefined rpm. Also, to secure the safe water level S, the controller 140 may control the pump motor 160 such that the rpm of the pump motor 160 is reduced by 20% which is a predefined portion.

The controller 140 according to an embodiment of the disclosure may obtain a water level frequency of water stored in the tub 20 through the water level sensor 120, and obtain a water level of the water based on a change of the water level frequency. At this time, the controller 140 may obtain an actual water level of water stored in the tub 20 based on water level data stored for each water level frequency. In a case in which a change of the water level frequency is sensed, the controller 140 may control the pump motor 160 such that the rpm of the pump motor 160 is reduced. According to the current embodiment of the disclosure, the controller 140 may determine a reduction of a water level by sensing a water level frequency that is higher than a previously sensed water level frequency.

In a case in which the controller 140 according to an embodiment of the disclosure senses no change of the water level frequency, the controller 140 may control the pump motor 160 such that the rpm of the pump motor 160 is maintained at the initial rpm.

Operation of the circulating pump 170, as shown in FIG. 7, relates to a control method, wherein rpm of the pump motor 160 is maintained at constant rpm regardless of a change in water level of water stored in the tub 20, and the water level changes according to operations of the motor 16 and the circulating pump 170.

Operation of the circulating pump 170, as shown in FIG. 8, relates to a control method according to an embodiment of the disclosure, wherein the controller 140 controls rpm of the pump motor 160 based on a change of a water level frequency.

As described above, a water level frequency may be lowered as a water level of the tub 20 is raised and accordingly internal pressure of the tub 20 is raised, and, as a water level of the tub 20 is lowered and accordingly internal pressure of the tub 20 is lowered, a water level frequency may be raised.

Referring to FIG. 8, the controller 140 may sense a change to a rise of a water level frequency at a point A, and determine that a water level is lowered. At this time, the controller 140 may determine that the water level is lowered by sensing the change of the water level frequency. Water level frequencies according to water levels of the tub 20 may be stored in the storage device 130. In response to a sensed water level frequency, the controller 140 may compare the sensed water level frequency with the water level frequencies according to water levels, stored in the storage device 130, and determine whether a current water level reaches the safe water level S.

According to a determination that the water level frequency reaches a water level frequency corresponding to the safe water level S, the controller 140 may control the pump motor 160 such that rpm of the pump motor 160 is reduced, at a point B1. As the rpm of the pump motor 160 is reduced, a water level of the tub 20 may be raised, and a quantity of water capable of cooling the heater 180 may increase.

After a preset time period has elapsed, the controller 140 may control the pump motor 160 such that rpm of the pump motor 160 returns to the initial rpm, at a point B2. In this case, the washing machine 1 may secure a more circulating quantity of water than a previous circulating quantity of water and again improve wetting performance with respect to laundry by increasing the rpm of the pump motor 160.

The above description relates to a method for lowering the rpm of the pump motor 160, in response to a water level of the tub 20, which is lower than or equal to the safe water level S, to secure a water level of the tub 20 while reducing a circulation quantity of water.

However, wetting performance by the circulating pump 170 may deteriorate as a circulating quantity of water is reduced. However, the wetting performance may be maintained through an on/off control of the circulating pump 170. This will be described with reference to FIGS. 9 to 12, below.

Figure 9:
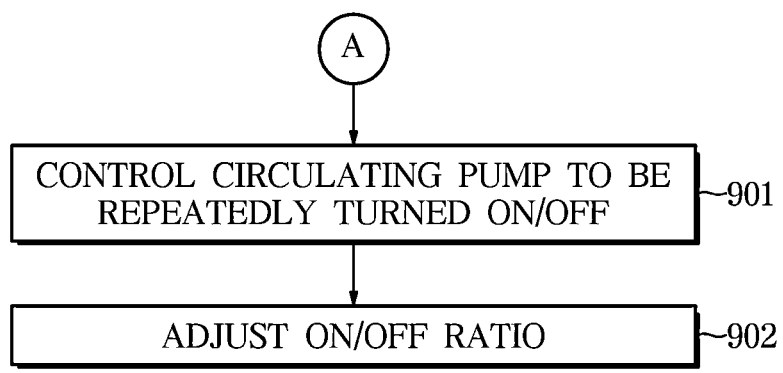
FIG. 9 is a flowchart illustrating a method for controlling a washing machine, according to an embodiment of the disclosure.
Figure 10:
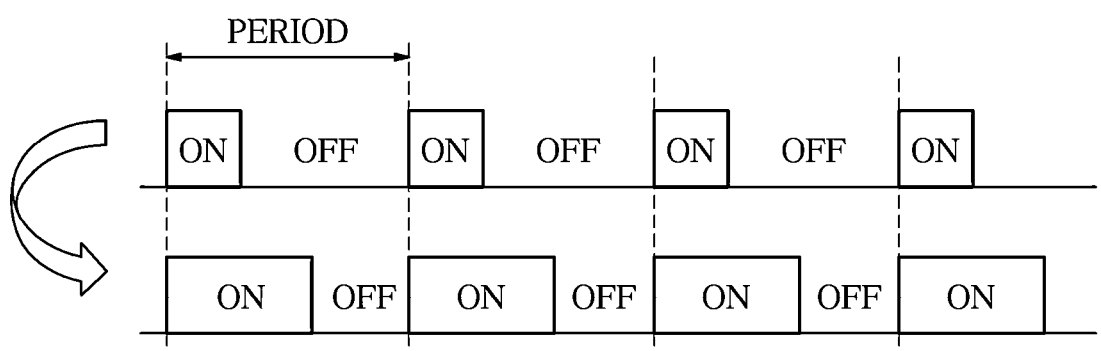
FIG. 10 is views for describing a method for controlling on/off operations in a washing machine according to one embodiment of the disclosure.
Figure 11:
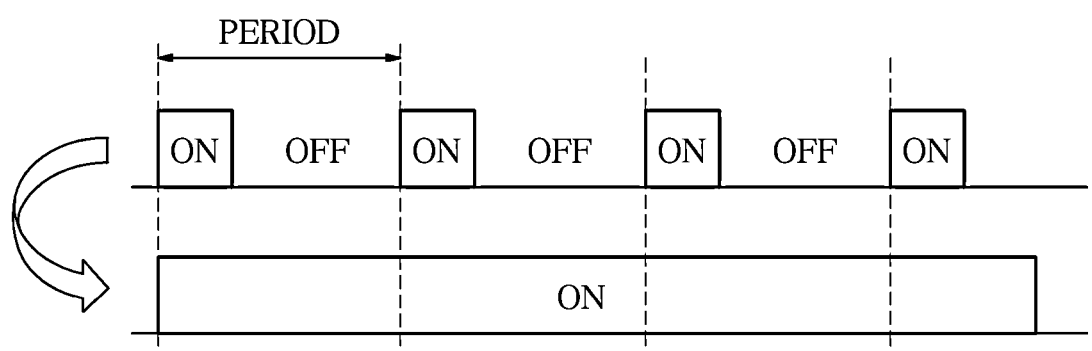
FIG. 11 is views for describing a method for controlling on/off operations in a washing machine according to another embodiment of the disclosure.
Figure 12:
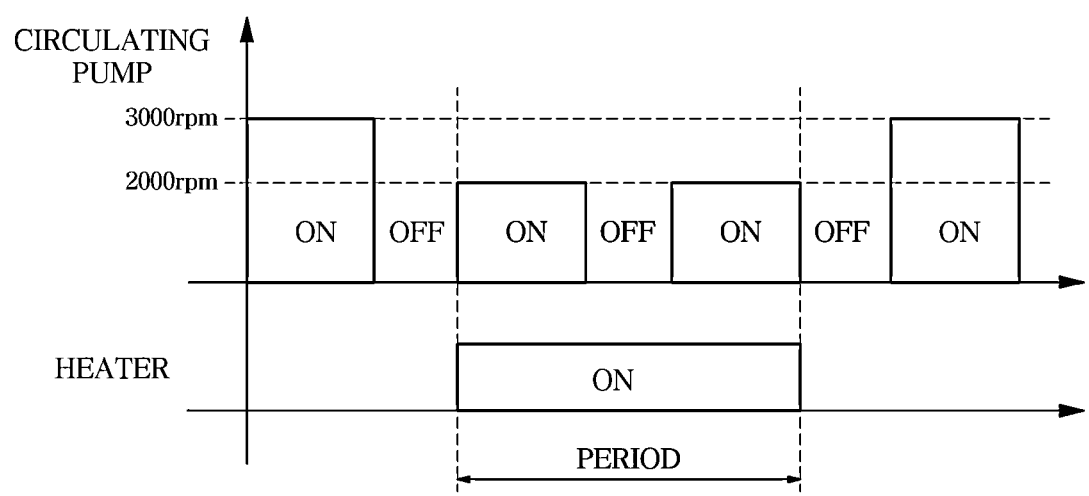
FIG. 12 is a view for describing a method for controlling a circulating pump according to operation of a heater in a washing machine according to an embodiment of the disclosure.

FIG. 9 is a flowchart illustrating a method for controlling a washing machine, according to an embodiment of the disclosure, FIGS. 10 and 11 are views for describing a method for controlling on/off operations in a washing machine according to an embodiment of the disclosure, and FIG. 12 is a view for describing a method for controlling a circulating pump according to operation of a heater in a washing machine according to an embodiment of the disclosure. The control method shown in FIG. 9 will be described in detail with reference to FIGS. 10 to 12, below.

The controller 140 may control the circulating pump 170 to be repeatedly turned on/off, in operation 901. As shown in FIGS. 10 and 11, the controller 140 may control the circulating pump 170 to be repeatedly turned on/off such that the spraying hole 60 sprays water intermittently according to a preset time period. In this case, because the controller 140 adjusts spraying of water with a limited circulating quantity of water, the controller 140 may improve wetting performance by increasing spraying pressure.

The controller 140 may adjust an on/off ratio, while controlling the circulating pump 170 to be repeatedly turned on/off, in operation 902.

Referring to FIG. 10, the controller 140 according to an embodiment of the disclosure may maintain a driving time period of the circulating pump 170, and control the circulating pump 170 to increase an on time for each driving time period of the circulating pump 170. In this case, a time for which water is sprayed within a preset time period may increase, and accordingly, wetting performance of the washing machine 1 may be improved.

Also, according to an embodiment of the disclosure, the controller 140 may increase a driving time of the circulating pump 170 in response to a reduction of rpm of the pump motor 160. In this case, by securing a longer wetting time than a typical wetting time, limitation according to a reduction of a circulating quantity of water may be overcome.

Referring to FIG. 11, the controller 140 according to an embodiment of the disclosure may control the circulating pump 170 to change off operations to on operations in the driving time period of the circulating pump 170. Accordingly, the washing machine 1 may secure typical wetting performance that is, washing performance.

Referring to FIG. 12, the controller 140 according to an embodiment of the disclosure may control the pump motor 160 to drive the circulating pump 170 at low rpm in a turned-on time period of the heater 180. The controller 140 may control the pump motor 160 to be driven at constant rpm, and control the circulating pump 170 to be repeatedly turned on/off. At this time, the controller 170 may control the pump motor 160 to be driven at low rpm in a turned-on time period of the heater 180. Also, the controller 140 may control the pump motor 160 to be driven at original rpm in a turned-off time period of the heater 180.

Meanwhile, the washing machine 1 according to an embodiment of the disclosure may adjust a quantity of water that is supplied to the tub 20, based on a weight of laundry. Thereby, the washing machine 1 may secure a larger quantity of water according to a greater weight of laundry, provide a more sufficient circulating quantity of water, and secure a water level that is higher than the safe water level S. Accordingly, in the following embodiment of the disclosure, operation of sensing a water level frequency based on a weight of laundry will be omitted.

Figure 13:
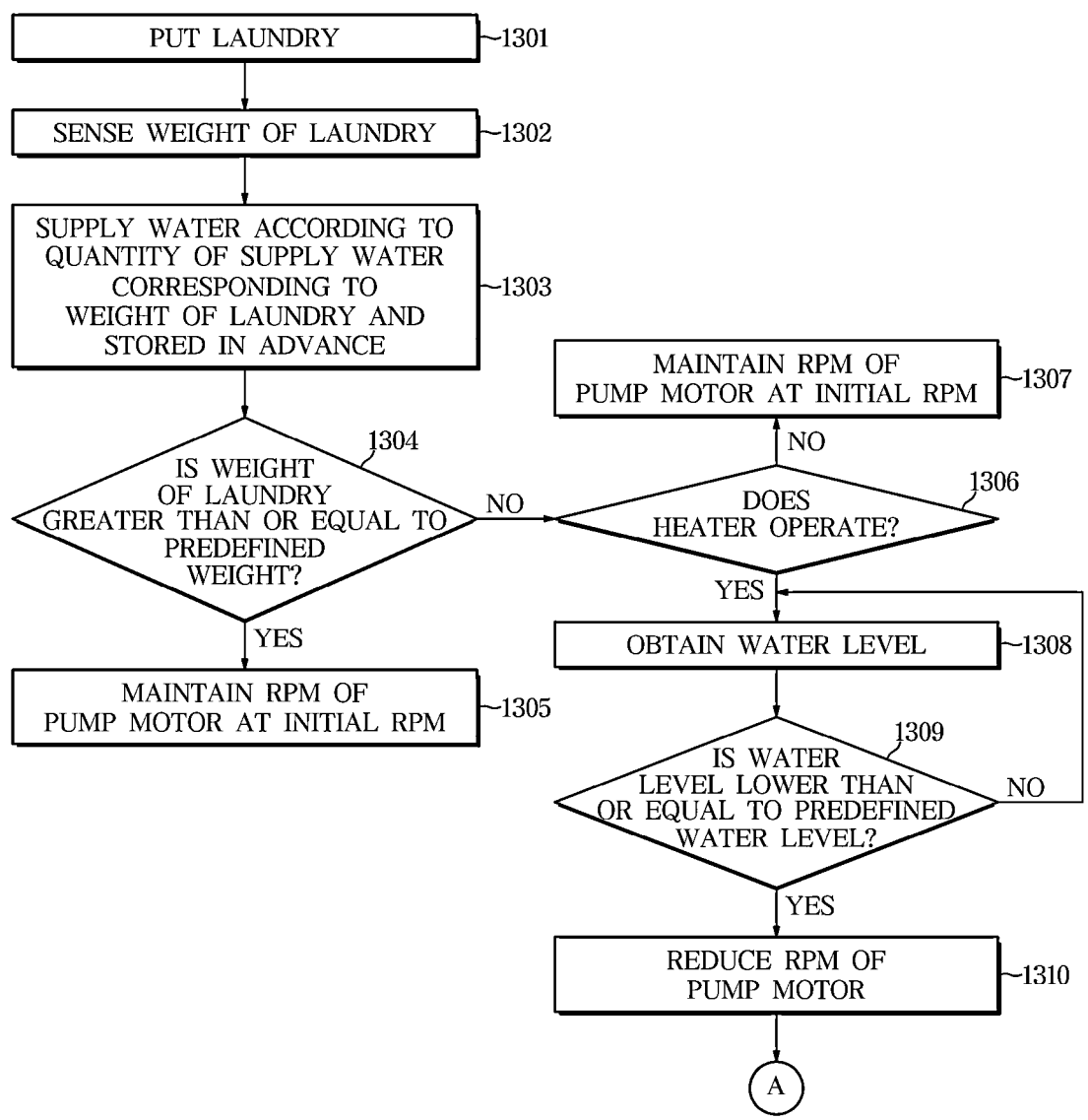
FIG. 13 is a flowchart illustrating a method for controlling a washing machine, according to an embodiment of the disclosure.

FIG. 13 is a flowchart illustrating a method for controlling a washing machine, according to an embodiment of the disclosure.

Laundry may be put, in operation 1301, and then, the controller 140 may sense a weight of the laundry, in operation 1302. At this time, the controller 140 may sense the weight of the laundry by using a weight sensor (not shown) provided in the washing machine 1, or based on a change amount of a load by a rotation of the motor 16. However, a method for sensing a weight of laundry is not limited to these, and various known weight sensing techniques may be applied.

After the laundry is put and the weight of the laundry is sensed, the washing machine 1 may supply water to the tub 20, in operation 1303. The controller 140 may control the water supply 150 to supply water from the outside through the first water supply pipe 151. The controller 140 may supply a quantity of water corresponding to the weight of the laundry to the tub 20 based on the weight of the laundry sensed in operation 1302.

In a case in which the weight of the laundry is greater than or equal to a predefined weight in operation 1304, the controller 140 may maintain rpm of the pump motor 160 at initial rpm, in operation 1305. Herein, the predefined weight may indicate a weight of laundry corresponding to a quantity of supply water which is a sum of a volume required for securing a circulating quantity of water and a volume required for securing the safe water level S or more. In this case, although water is reduced by a circulating quantity of water in the tub 20, the safe water level S may be secured, and accordingly, a process for sensing a water level frequency may be not needed.

Also, in a case in which the heater 180 does not operate in operation 1306 although the weight of the laundry is smaller than the predefined weight in operation 1304, the controller 140 may maintain rpm of the pump motor 160 at the initial rpm, in operation 1307.

The controller 140 may determine whether the heater 180 operates, in operation 1306, and, according to a determination that the heater 180 operates, the controller 140 may obtain a water level of the tub 20, in operation 1308. The water level may be obtained through the water level sensor 120, and the water level sensor 120 may obtain a water level of water stored in the tub 20 by obtaining a water level frequency corresponding to internal pressure of the tub 20, and transfer the water level to the controller 140.

The controller 140 may obtain the water level, and determine whether the water level is lower than or equal to a predefined water level, in operation 1309. Herein, the predefined water level may correspond to the safe water level S. The safe water level S may be a minimum quantity of water capable of performing cooling by using water in the tub 20, and may be criterion for preventing the heater 180 from being overheated. The safe water level S may be a minimum quantity of water capable of performing cooling by using water in the tub 20, and may be criterion for preventing the heater 180 from being overheated. According to an embodiment of the disclosure, the predefined water level may be the safe water level S, however, the predefined water level may be set to be higher than the safe water level S to tighten criterion against overheating of the heater 180.

According to a determination that the water level is lower than or equal to the predefined water level, the controller 140 may reduce rpm of the pump motor 160, in operation 1310. According to the reduction of the rpm of the pump motor 160, a quantity of water circulating by the circulating pump 170 may be reduced, and water corresponding to the reduced circulating quantity of water may be supplied to the tub 20 to maintain the safe water level S of the tub 20.

After operation 1310, the control method shown in FIG. 9 may be additionally performed.

According to an aspect of the disclosure, by adjusting a quantity of water circulating by the circulating pump to maintain a safe water level of the tub, the heater may be prevented from being overheated.

Meanwhile, the disclosed embodiments of the disclosure may be implemented in the form of a recording medium that stores instructions executable by a computer. The instructions may be stored in the form of program codes, and when executed by a processor, the instructions may create a program module to perform operations of the disclosed embodiments of the disclosure. The recording medium may be implemented as a computer-readable recording medium.

The computer-readable recording medium may include all kinds of recording media storing instructions that can be interpreted by a computer. For example, the computer-readable recording medium may be ROM, RAM, a magnetic tape, a magnetic disc, a flash memory, an optical data storage device, etc.

The machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., Play Store™) or between two user devices (e.g., smart phones) directly. When distributed online, at least part of the computer program product (e.g., a downloadable app) may be temporarily generated or at least temporarily stored in the machine-readable storage medium, such as a memory of the manufacturer's server, a server of the application store, or a relay server.

So far, the disclosed embodiments have been described with reference to the accompanying drawings. It will be apparent that those skilled in the art can make various modifications thereto without changing the technical spirit and essential features of the present disclosure. Thus, it should be understood that the embodiments described above are merely for illustrative purposes and not for limitation purposes in all aspects.

What is claimed is:

1. A washing machine comprising:
a tub configured to receive water;
a drum rotatable inside the tub;
a heater configured to heat water received in the tub;
a circulating pump configured to circulate a portion of the water received in the tub;
a water level sensor configured to sense a water level of the water in the tub; and
a controller configured to:
control revolutions per minute (rpm) of a motor of the circulating pump to an initial rpm of the motor and control a turned-on time of the motor during one cycle to a first turned-on time based on the water level sensed by the water level sensor exceeding a predefined water level, while the circulating pump and the heater is driven, and
control the revolutions per minute (rpm) of a meterthe motor of the circulating pump to a rpm lower than the initial rpm and control the turned-on time of the motor during one cycle to a second time longer than the first turned-on time based on the water level sensed by the water level sensor is equal to or lower than the predefined water level, while the circulating pump and the heater are driven.

2. The washing machine of claim 1, wherein the controller is further configured to control the circulating pump to reduce the rpm of the motor in a case in which the sensed water level of the water in the tub is lower than or equal to a predefined water level.

3. The washing machine of claim 1, wherein the controller is further configured to control the circulating pump to reduce the rpm of the motor to a predefined rpm or by a predefined amount.

4. The washing machine of claim 1, wherein the controller is further configured to control the circulating pump to be repeatedly turned-on and turned-off according to a predefined time period and increase a turned-on time during the predefined time period.

5. The washing machine of claim 4, wherein the controller is further configured to control the circulating pump to change a turned-off operation to a turned-on operation during the predefined time period.

6. The washing machine of claim 1, wherein the controller is further configured to increase a driving time of the circulating pump in response to a reduction of the rpm of the motor.

7. The washing machine of claim 1, wherein the controller is further configured to obtain a water level frequency of the tub through the water level sensor, obtain the water level of the water based on a change of the water level frequency, and reduce the rpm of the circulating pump in a case in which a change of the water level frequency is sensed.

8. The washing machine of claim 7, wherein the controller is further configured to control the circulating pump to maintain the rpm of the motor at an initial rpm in a case in which no change of the water level frequency is sensed.

9. The washing machine of claim 1, wherein the controller is further configured to control the circulating pump to maintain the rpm of the motor at an initial rpm in a case in which the heater is not driven.

10. The washing machine of claim 1, wherein the controller is further configured to control the circulating pump according to constant rpm of the motor, control the circulating pump to be repeatedly turned-on and turned-off, and control the circulating pump to reduce the rpm of the motor for a turned-on time period of the heater.

11. The washing machine of claim 1, wherein the controller is further configured to reduce a quantity of water that is sprayed to an interior of the tub by reducing the rpm of the motor.

12. The washing machine of claim 1, wherein the controller is further configured to sense a weight of laundry in the tub, and supply the water to the tub based on the weight of the laundry.

13. The washing machine of claim 12, wherein the controller is further configured to obtain, in a case in which the sensed weight of the laundry is smaller than a predefined weight, a water level frequency of the tub through the water level sensor, obtain the water level of the water based on a change of the water level frequency, and control the circulating pump to reduce the rpm of the motor in a case in which a change of the water level frequency is sensed.

14. The washing machine of claim 12, wherein the controller is further configured to control, in a case in which the sensed weight of the laundry is greater than or equal to a predefined weight, the circulating pump to maintain the rpm of the motor at an initial rpm of the motor.

15. The washing machine of claim 12, wherein the controller is further configured to control the circulating pump to reduce the rpm of the motor by based on a weight value proportional to the weight of the laundry applied to the rpm of the motor.

16. A method for controlling a washing machine, the method comprising:

controlling revolutions per minute (rpm) of a motor of a circulating pump to an initial rpm of the motor and control a turned-on time of the motor during one cycle to a first turned-on time based on a water level sensed by a water level sensor exceeding a predefined water level, while the circulating pump and a heater configured to heat water in a tub is driven; and controlling the revolutions per minute (rpm) of the motor of the circulating pump to a rpm lower than the initial rpm and control the turned-on time of the motor during one cycle to a second time longer than the first turned-on time based on the water level sensed by the water level sensor is equal to or lower than the predefined water level, while the circulating pump and the heater are driven.

17. The method of claim 16, wherein the controlling of the circulating pump comprises controlling the circulating pump to reduce the rpm of the motor in a case in which the sensed water level of the water in the tub is lower than or equal to a predefined water level.

18. The method of claim 17, wherein the controlling of the circulating pump comprises controlling the circulating pump to reduce the rpm of the motor to a predefined rpm or by a predefined amount.

19. The method of claim 16, further comprising controlling the circulating pump to be repeatedly turned-on and turned-off according to a predefined time period and increase a turned-on time during the predefined time period.

20. The method of claim 19, wherein the controlling of the circulating pump comprises controlling the circulating pump to change a turned-off operation to a turned-on operation during the predefined time period.

* * * * *

UNITED STATES PATENT AND TRADEMARK OFFICE
CERTIFICATE OF CORRECTION

PATENT NO. : 12,209,350 B2
APPLICATION NO. : 17/741572
DATED : January 28, 2025
INVENTOR(S) : Seunghun Lee et al.

Page 1 of 1

It is certified that error appears in the above-identified patent and that said Letters Patent is hereby corrected as shown below:

In the Claims

Column 14, Line 8:
In Claim 1, delete "a meterthe" and insert -- the --.

Column 15, Line 16:
In Claim 15, after "motor" delete "by".

Signed and Sealed this
Twentieth Day of May, 2025

Coke Morgan Stewart
*Acting Director of the United States Patent and Trademark Office*